Patented Apr. 7, 1931

1,799,452

UNITED STATES PATENT OFFICE

JOHN S. BEEKLEY, OF CHARLESTON, WEST VIRGINIA, ASSIGNOR TO DU PONT AMMONIA CORPORATION, OF WILMINGTON, DELAWARE, A CORPORATION OF DELAWARE

PROCESS OF PRODUCING HYDROGEN

No Drawing.    Application filed July 27, 1928.  Serial No. 295,842.

This invention relates to the manufacture of hydrogen and particularly to a process for producing hydrogen from a gaseous hydrocarbon by reaction thereof with steam.

It is known that methane can be converted into hydrogen by interaction with steam. The chemical reactions involved are—

$$CH_4 + 2H_2O = CO_2 + 4H_2$$
$$CH_4 + H_2O = CO + 3H_2.$$

Thus, for example, it has been proposed to manufacture hydrogen by submitting a gaseous mixture of steam and methane at temperatures above 700° C. to the action of a nickel catalyst. This process has apparently found no commercial application, presumably because at these high reaction temperatures it is difficult to maintain catalyst activity and the reaction products will contain considerable amounts of carbon monoxide unless excessive quantities of steam are employed. Furthermore, such processes as have hitherto been proposed have suffered from the difficulty that under even the most favorable conditions the reaction products contain not only carbon monoxide and carbon dioxide but also some unconverted methane. The isolation of pure hydrogen from this mixture is expensive, particularly since the complete removal of methane from hydrogen contaminated therewith is accomplished only with difficulty. Inasmuch as the presence of methane in hydrogen is very objectionable in some processes in which the latter is utilized, it is highly desirable that a method be available for producing from methane by catalysis hydrogen uncontaminated with methane.

It is the object of the present invention to provide a process for the manufacture of hydrogen substantially free from methane and oxides of carbon by the reaction of steam and methane.

Other objects and advantages of the invention will be apparent as it is better understood by reference to the following specification in which its details and preferred embodiments are described.

I have found that hydrogen containing little or no methane or oxide of carbon may be produced from methane by subjecting a gaseous mixture of steam and methane, at relatively low temperatures, to the combined action of magnesia and a catalyst. As a catalyst I employ an element or compound that is catalytically active for the conversion of steam and methane to hydrogen, especially the elements nickel and cobalt or compounds and mixtures containing the same. The catalytic elements may be used singly or together, and may have associated with them elements that are of themselves not catalysts for the reaction. Thus, for example, the process may consist in submitting steam and methane to the combined action of magnesia and nickel; magnesia and cobalt; magnesia, nickel and cobalt; magnesia, nickel and chromium; magnesia, cobalt and chromium; magnesia, nickel and cerium; magnesia and cobalt chromate; magnesia, cobolt and cerium; magnesia, nickel, cerium and aluminum; magnesia and nickel chromate; etc.

The activity of some elements that are normally catalysts for the methane-steam reaction may be improved and elements that are ordinarily poor catalysts may be made active for the reaction, by observing certain conditions. Thus, for example, there are certain elements whose activity appears to be impaired by their tendency to exist only in an oxidized state during the methane-steam reaction. Such elements show an improved behavior if the gaseous mixture of steam and methane brought into contact therewith contains some hydrogen. Similarly an improvement results if the catalytic element is intimately associated with copper, or another element that is not readily oxidized under the conditions of operation. For example, then the contact mass may consist of magnesia, iron and copper, magnesia, cobalt and copper, or magnesia, nickel and copper. Or the contact mass may be magnesia and iron, over which a gaseous mixture of steam and methane, together with some hydrogen, is passed.

For the most satisfactory results the preparation of the catalyst as well as the hydrogen producing process itself should be carried on in the absence of catalyst poisons, particularly the halogens and sulphur, and compounds thereof.

It will be understood that the magnesia used in the process is not employed as a promoter of the catalyst associated therewith; at least, not in the usual sense of the word promoter which customarily designates a substance added to a catalyst in relatively small proportions to enhance its activity. In the process described herein the magnesia is the preponderant constituent of the solid material with which the gaseous reactants contact, it being necessary to use only a relatively small proportion of catalyst, say from one to ten per cent. by weight of the magnesia.

The charge of magnesia and catalyst may be prepared in various ways, the primary requisite being that the magnesia and catalyst be prepared and disposed within the reaction apparatus in such a manner that the gases to react may contact practically simultaneously with catalyst and magnesia. Thus, for example, a suitable charge may be made by dry mixing magnesia and a catalytic element or catalytic elements, or suitable compounds thereof. Also magnesia may be impregnated with solutions of salts of the catalytic metals, such as nitrates, acetates, etc., which upon calcining the magnesia are converted into catalytically active form. Or, if desired, granules or lumps of magnesia may be mingled with particles of catalyst carried on suitable supports, such as pumice, asbestos, etc.

With regard to proportions of materials employed the amount of magnesia should be at least that equivalent to the methane used. In other words, each mole of methane should have the opportunity of contacting with at least one mole of magnesia. Furthermore, I have found that for the most satisfactory results with respect to purity of the hydrogen produced the volume ratio of steam to methane used should be at least 2:1.

While the process is not limited to the use of any specific temperature, I have not been able to secure the desired results at temperatures substantially in excess of about 600° C. Various considerations, including the purity of the methane used, the cost of steam, size and shape of apparatus available and the specific nature of the catalyst employed will determine the optimum temperature of reaction under any particular circumstances. Generally speaking, however, temperatures within the range of about 300°–450° C. are preferred as being adapted for the production of most economical and satisfactory results.

The reaction may be carried out in either a continuous or discontinuous manner. That is, if a fixed charge of magnesia and catalyst is employed, so much of the magnesia will ultimately be converted to magnesium carbonate that the efficiency of the methane conversion will be greatly lowered. The magnesia catalyst charge should then be replaced with a fresh charge, the discharged material being preferably regenerated for further use by heating to convert the magnesium carbonate to magnesium oxide, care being taken to avoid the introduction of substances deleterious to the catalyst. If desired two or more convertors may be used, continuous production being obtained by having one convertor in operation while one or more are being heated to regenerate the spent contact mass.

On the other hand, continuous operation of the process may be accomplished by employing one of the known types of apparatus in which a continuously replaced mass of solid material may be treated with a gaseous stream. In such an apparatus the magnesia and catalyst may be continuously introduced and withdrawn at such a rate that there is always present an adequate amount of active and efficient contact mass. Preferably the steam-methane mixture is passed in a direction opposite to that of the moving solid.

The normal reaction of steam and methane is decidedly endothermic. The process herein described has the advantage of being but moderately endothermic so that when the gaseous reactants have been brought to reaction temperature, by heat exchange with the hot gaseous products or by other means, but little heat need be added to support the reaction. Such heat as is required may be supplied in various ways. For example, the gases entering the reaction apparatus may be preheated above reacting temperature to such an extent that the heat absorbed by the reaction will not lower the temperature below reacting temperature; or the heat may be supplied from an external source, as by electrical heating; or oxygen or air may be added to the gases before or during reaction to furnish the necessary heat by combustion.

A further feature of the invention consists in the discovery that the process hereinbefore described can be carried out more economically and satisfactorily at pressures in excess of atmospheric. Not only does the reaction proceed more satisfactorily at increased pressure but also important economies can be realized because of the decreased size of reaction apparatus and the smaller requirements for heat exchange apparatus. Pressures of from one to fifty atmospheres are suitable although higher pressures may also be used.

Although the invention is susceptible of considerable variation in the manner of its application to the practical manufacture of hydrogen, for purposes of illustration the following examples are given to indicate a typical method of practising the invention.

*Example 1.*—Crush pumice stone and screen to eight to fourteen mesh. Wash with boiling hydrochloric acid until free from iron and then with boiling distilled water until free from chloride. After drying at 200° C. stir 100 parts at that temperature into a boiling solution of 50 parts of nickel nitrate and 2.6 parts of cerium nitrate and 7.5 parts of aluminum nitrate, all of which should be free from sulphur, halogens and other contact poisons, in 70 parts of distilled water. After absorption is complete, remove the pumice from the solution and calcine at 400° C. until the nitrogen oxides have been expelled. Mix this material intimately with calcined magnesia of eight to fourteen mesh size in the volume proportion of about 1:2. The contact mass thus prepared is disposed within a reaction apparatus adapted to withstand a pressure of 20 atmospheres or more. The apparatus is equipped with suitable heating means, such as electrical heating coils, for adding such heat as may be necessary for maintenance of the reaction. A gaseous mixture of steam and methane in the volume ratios of from about 11:1 to 29:1, and free from sulphur compounds, is supplied to the furnace wherein it passes over the contact mass at a pressure of twenty atmospheres. The temperature of the reaction apparatus is maintained at about 350°–400° C. After removal of excess of steam by cooling, the gaseous product will be found to consist of hydrogen relatively free from methane, carbon monoxide and carbon dioxide.

When the spent condition of the magnesia is indicated by the presence of substantial amounts of methane or carbon oxide in the gaseous product, the charge is regenerated, the magnesium carbonate being converted to oxide by heating at atmospheric pressure.

Substantially the same results may be obtained by operating as above indicated at atmospheric pressure, using about one-half the proportions of steam specified.

*Example 2.*—A contact mass is prepared by thoroughly wetting magnesia with a 20% solution of nickel nitrate and filtering the excess solution. The magnesia is then dried and the product is formed into briquettes which are placed in a reaction apparatus and used in the production of hydrogen in accordance with the directions given in the preceding example.

As previously indicated the process may be made a substantially continuous one by providing two or more reaction vessels, so that while one is being used for methane conversion the charges in one or more may be in process of reactivation. Or if desired a reaction vessel may be employed which is adapted for the continuous withdrawal of the spent magnesia-catalyst charge and replacement thereof with fresh material.

The method as herein described is not restricted to the use of methane; other gaseous hydrocarbons homologous with methane may also be employed and are to be considered as the equivalents thereof.

Various changes may be made in the method described without departing from the invention or sacrificing any of the advantages thereof.

I claim:

1. The process of producing hydrogen which comprises subjecting a mixture of steam and methane, in the volume ratio of at least 2:1, at a pressure within the range of from 1 to 50 atmospheres and a temperature below 600° C. to the combined action of a nickel catalyst and magnesia, the latter being present in the proportion of at least one mole of magnesia per mole of methane in said gaseous mixture.

2. The process of producing hydrogen which comprises subjecting a mixture of steam and methane to the combined action of a methane-steam converting catalyst and magnesia, the latter being maintained present in the proportion of at least one mole of magnesia per mole of methane in said gaseous mixture.

3. The process of producing hydrogen which comprises subjecting a mixture of steam and methane to the combined action of a nickel catalyst and magnesia, the latter being maintained present in the proportion of at least one mole of magnesia per mole of methane in said gaseous mixture.

4. The process of producing hydrogen which comprises subjecting a mixture of steam and methane at a pressure higher than atmospheric to the combined action of a methane-steam converting catalyst and magnesia, the latter being present in the proportion of at least one mole of magnesia per mole of methane in said gaseous mixture.

5. The process of producing hydrogen which comprises subjecting a mixture of steam and methane at a pressure within the range of from 1 to 50 atmospheres to the combined action of a methane-steam converting catalyst and magnesia, the latter being present in the proportion of at least one mole of magnesia per mole of methane in said gaseous mixture.

6. The process of producing hydrogen which comprises subjecting a mixture of steam and methane at reacting temperature below about 600° C. to the combined action of a methane-steam converting catalyst and magnesia.

7. The process of producing hydrogen which comprises subjecting a mixture of steam and methane, in the volume ratio of at least 2:1, to the combined action of a methane-steam converting catalyst and magnesia, the latter being present in the proportion of at least one mole of magnesia per mole of methane in said gaseous mixture.

8. The process of producing hydrogen which comprises subjecting a mixture of steam and methane to the action of a heated contact mass comprising magnesia associated with about 1% to about 10% of nickel, at a temperature not exceeding about 600° C. while maintaining a proportion of magnesia of at least one mole thereof per mole of methane in said gaseous mixture.

In testimony whereof, I affix my signature.

JOHN S. BEEKLEY.